(12) United States Patent
Bogin et al.

(10) Patent No.: US 6,502,150 B1
(45) Date of Patent: Dec. 31, 2002

(54) METHOD AND APPARATUS FOR RESOURCE SHARING IN A MULTI-PROCESSOR SYSTEM

(75) Inventors: Zohar Bogin, Folsom, CA (US); Narendra S. Khandekar, Folsom, CA (US); Steve J. Clohset, Sacremento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,649

(22) Filed: Dec. 3, 1998

(51) Int. Cl.⁷ .............................................. G06F 13/00
(52) U.S. Cl. ...................... 710/240; 710/116
(58) Field of Search ................. 710/200, 113, 710/107, 240, 244, 116

(56) References Cited

U.S. PATENT DOCUMENTS

| | | | | |
|---|---|---|---|---|
| 5,706,446 A | * | 1/1998 | Kalish et al. ............... | 710/113 |
| 5,734,846 A | * | 3/1998 | Robertson .................... | 710/113 |
| 5,941,967 A | * | 8/1999 | Zulian ......................... | 710/107 |
| 6,016,528 A | * | 1/2000 | Jaramillo et al. ........... | 710/107 |
| 6,078,981 A | * | 6/2000 | Hill et al. .................... | 710/200 |
| 6,088,751 A | * | 7/2000 | Jaramillo .................... | 710/116 |
| 6,108,739 A | * | 8/2000 | James et al. ................ | 710/113 |
| 6,141,715 A | * | 10/2000 | Porterfield .................. | 710/113 |

* cited by examiner

Primary Examiner—Glenn A. Auve
(74) Attorney, Agent, or Firm—Blakely, Sokoloff, Taylor & Zafman LLP

(57) ABSTRACT

A computer system that includes at least two host agents is provided. The computer system further includes a chipset that includes a resource to be shared by the at least two host agents. The chipset is coupled to the-at least two host agents. The chipset prevents a first host agent, that occupies the shared resource to access the shared resource until a second host agent, has made progress in accessing said shared resource.

12 Claims, 4 Drawing Sheets

METHOD AND APPARATUS FOR RESOURCE SHARING IN A MULTI-PROCESSOR SYSTEM

BACKGROUND OF THE INVENTION

I. Field of the Invention

The present invention relates to the field of computer systems. More specifically, the present invention relates to chipsets in computer systems.

II. Background Information

A multi-processor system is a system that includes at least two processors. The at least two processors are coupled to a host bus. The host bus is typically coupled to a chipset that, among other things, may control access to a system memory. The chipset may be coupled to an input/output bus for access to input/output devices. The input/output bus may be a Peripheral Component Interconnect (PCI) bus.

There are instances when more than one processor desires to perform an access to the PCI bus. For example, assume a case where the multi-processor system included two processors, CPU1 an CPU2, and both processors want to perform a stream of write operations to the PCI bus. In these instances the system uses the chipset, that is coupled to both the host bus and to the PCI bus, in performing the series of write operations. Assuming that a particular device such as a holding buffer is used by the chipset to store portions of data to be written by one of the CPUs to the PCI. When CPU1 does a series of line-writes to PCI, the holding buffer may fill up at a certain point in time. When CPU2 initiates a write on the host bus attempting to perform a write to the PCI bus, the chipset may detect that the holding buffer is full. In this case, typically, the chipset may retry CPU2. By retrying CPU2 the chipset tells CPU2 to try the same cycle (the write cycle to the PCI bus) at a later time because the chipset is not in a position to complete the cycle at the current time. Eventually, the chipset flushes the holding buffer out to PCI thus creating space to receive more data to be written to the PCI. However, before CPU2 may initiate another write cycle, CPU1 may come back and fill up the holding buffer again. This sequence may repeat indefinitely, such that CPU2 may not be permitted access to the shared resource for a certain period of time and livelock may occur in the system.

It is desirable to provide a method and apparatus for sharing a resource in a multi-processor system where the CPUs may share a resource efficiently without being unnecessarily prevented from timely utilizing a shared resource.

SUMMARY OF THE INVENTION

The present invention provides a computer system that includes at least two host agents. The computer system further includes a chipset that includes a shared resource to be shared by the at least two host agents. The chipset prevents a first host agent, that occupies the shared resource from accessing the shared resource until the second host agent, has made progress in accessing the shared resource.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

The present invention provides a computer system that includes at least two host agents. The computer system further includes a chipset coupled to the at least two host agents. The computer system also includes a shared resource shared by the at least two host agents. The chipset prevents a first host agent, that occupies the shared resource, to access the shared resource until the second has made progress in accessing the shared resource. By preventing the first host agent, that occupies the shared resource, from accessing the shared resource if a second host agent has not made progress, the present system provides a way for the second host agent to make progresses in accessing the shared resource, and to eventually access the shared resource. This prevents the second host agent from unnecessarily waiting for a long time before being able to access the shared resource.

Figure 1:
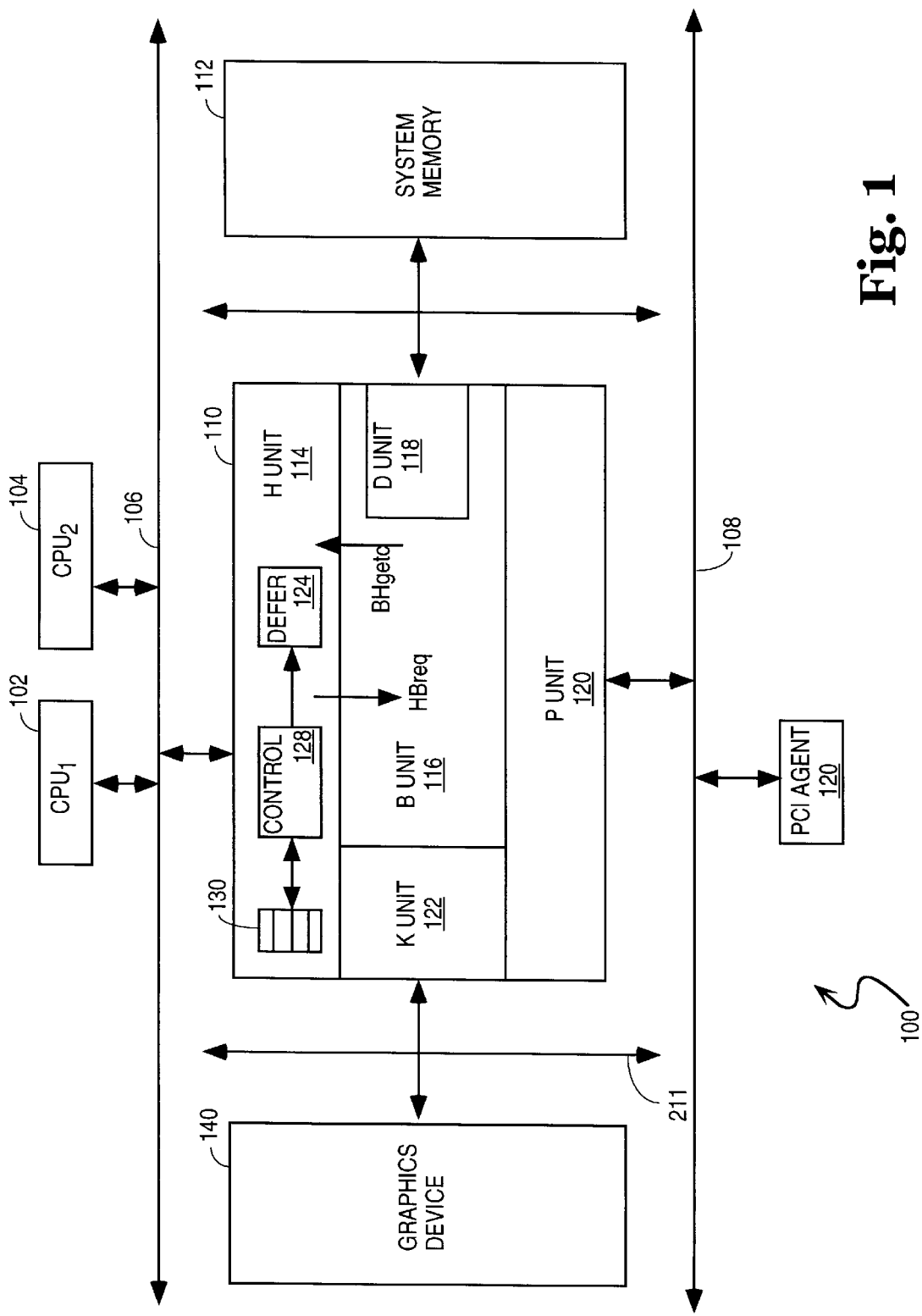
FIG. 1 illustrates an exemplary block diagram of a computer system according to one embodiment of the present invention.

FIG. 1 illustrates an exemplary block diagram of a computer system 100 according to one embodiment of the present invention. Computer system 100 includes at least two host agents (hereinafter referred to as "processors 102 and 104") coupled to a host bus 106. Host bus 106 is coupled to a chipset (hereinafter referred to as "host bridge 110"). The host bridge 110 is further coupled to an input/output (I/O) bus 108 and to a system memory 112.

In one embodiment of the present invention, the I/O bus 108 includes a Peripheral Component Interconnect (PCI) bus, but the present invention is not limited in this respect to this implementation. Also, in one embodiment of the present invention, system memory 112 includes a Dynamic Random Access Memory (DRAM), but the present invention is not limited in this respect to this implementation. Host bridge 110 includes a plurality of units that perform different functions. The host bridge 110 includes a host interface unit (H Unit) 114 that interfaces host bridge 110 with host bus 106 and with processors 102 and 104. Host bridge 110 also includes a bridge interface unit (B Unit) 116 that controls the interaction between various devices such as processors 102 and 104, PCI devices, of which PCI device 120 is shown, and DRAM 112. Host bridge 110 further includes DRAM interface unit (D Unit) 118 that may dock several devices to DRAM 112. A PCI interface unit 120 interfaces between PCI bus 108 and PCI devices 120, and the rest of computer system 100. An accelerated graphics port (AGP)/PCI interface unit (K Unit) 122 may be coupled to graphics devices 140.

The H Unit 114 includes a shared resource called "defer buffer" 124 that may be used for out-of-order cycles by processors 102 and 104. Typically, one of the processors may initiate a cycle to PCI bus 108, access a desired device on PCI bus 108, and wait for several cycles for the return of data to host bus 106. These cycles typically take a very long amount of time as compared to memory cycles to DRAM which are shorter. In a computer system according to one embodiment of the present invention that utilizes Pentium II® processors manufactured by Intel Corporation of Santa Clara, Calif. a mechanism is implemented where a cycle is deferred. The host bridge 110 takes a cycle that would potentially take a very long time to complete and defers it. Host bridge 110 informs a respective processor that the respective cycle will be completed out-of-order at a later time when the host bridge eventually accesses the PCI bus device, gets data back from a PCI device, and has data ready for the processor. This is called a deferred cycle and is defined by Pentium II® processing protocol.

Data ready for the processor is stored in a defer buffer 124. The host bridge 110 may allow only one of the processors to access the defer buffer 124 at a given time. In one embodiment according to the present invention, defer buffer 124 has the size of one cache line, but the present invention is not limited to this implementation for the size of the defer buffer.

Moreover, the H Unit includes an in-order queue 130 that stores agents ID identifying processors that initiated a request to the host bridge 110. The in-order queue 130 identifies the agent ID of the agent that initiated the last request.

Whenever the defer buffer 124 is occupied by one of the processors, host bridge 110 keeps on checking for another processor to initiate a cycle that would require access to the defer buffer. Assume that processor 102 (CPU1) was occupying the defer buffer in the course of an input/output access to PCI bus 108. When processor 104 initiates a cycle that requires access to the defer buffer 124, processor 104 is retried because the first processor 102 occupies the defer buffer 124. The embodiment of the computer system of the present invention handles this resource conflict by utilizing a mechanism which sets a flag, herein defined as a "retry flag" in a flip-flop (not shown). The retry flag specifies which CPU was the first to be retried by the host bridge 110. The embodiment of the computer system of the present invention utilizes a control logic 128 in the H Unit 114, coupled to defer buffer 124. Control logic 128 sets a second flag (defer flag) in the defer buffer 124 specifying which processor was last occupying the defer buffer. Any subsequent accesses by processor 102 are retried until processor 104 had the chance of making progress in accessing the requested shared resource.

In the example presented herein, processor 104 was the first to be retried by the host bridge 110 and the retry flag remains set until processor 104 had the chance to make progress in accessing the defer buffer. To ensure that processor 104 is eventually able to make progress, H Unit 114 prevents further accesses to the defer buffer 124, from processor 102 until an indication that processor 104 was able to make progress is received. Note that "making progress" is not limited to access to defer buffer 124 but may refer to progress to other resources. These other resources are resources that when accessed by processor 104, make access to the defer buffer more likely and in a more timely manner. A processor may work on multiple streams in parallel. However, if one stream is blocked (access to the defer buffer in this case) then the other streams will eventually be gated by the lack of progress on the blocked stream. At this stage, the processor will only attempt requests for the originally blocked stream (access to the defer buffer in this case.) The defer flag remains set until processor 104 has had the chance to make progresses.

Figure 2:
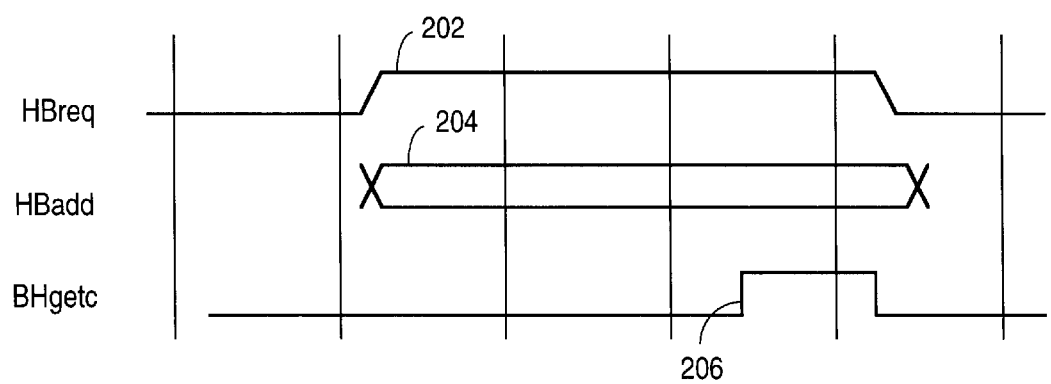
FIG. 2 illustrates a time diagram that shows several signals involved in identifying whether a certain processor has made progress.

FIG. 2 illustrates a time diagram that shows several signals involved in identifying whether a certain processor has made progress. Assume processor 104 desires to make an access to DRAM 112. Any access to DRAM 112 goes from the H Unit 114, through the B Unit 116, through the D Unit 118 and to the DRAM 117. The host bridge 110 of FIG. 1 implements a protocol according to which when a request by a processor is received by the H Unit 114, H Unit 114 initiates a request to the B Unit 116 identified by HBREQ signal 202. The HBREQ 202 goes high when the request is received by B Unit 116 from the H Unit 114. The H Unit 114 then provides to the B Unit 116 all information required to initiate the access to the DRAM, which may includes the address and the data, if the cycle is a write cycle for example. Signal 204, labeled HBADD, is the address signal and is valid during the duration of the access to DRAM 117. Once B Unit 116 is able to process the request, B Unit 116 further transfers the request to D Unit 118 and so on. The data may then be provided by the DRAM 117 to the D Unit 118 and to the B Unit 116.

When the B Unit 116 is provided data from the H Unit 114, the B unit asserts a signal BHgetC 206 to the H Unit 114. Once the H Unit 114 detects the signal BHgetC 206 asserted, the H Unit 114 knows that the processor cycle, for which it asserted the request HBREQ, will eventually complete at the destination (DRAM) and so processor 104, that initiated the request, is making progress. The H Unit then looks at the in-order queue 130 to determine the agent ID last written to queue 130. In this example, the agent ID corresponding to processor 104 is the last agent ID written to the in-order queue 130. The agent ID tells the H Unit 114 that processor 104 initiated the request. Therefore, when the H Unit 114 receives the signal BHgetC 206 and determines that processor 104 initiated the request, H Unit 114 determines that processor 104 is making progress. Since processor 104 is making progress, the retry flag is reset by control logic 128 permitting processor 102 to make access to the defer buffer if such action is desired by processor 102.

The present invention may also be utilized when accesses by processor 104 are to devices other than the memory. In this case the getc signal will be in connection with a unit other than the B Unit such as the K Unit for example, and the signal analogous to BHgetC would be KHgetC, for example.

Control logic 128 of FIG. 1 controls setting and resetting of flags and retrying the processors. Control logic 128 includes two state machines, that run simultaneously and track each other in one embodiment according to the present invention described herein.

Figure 3:
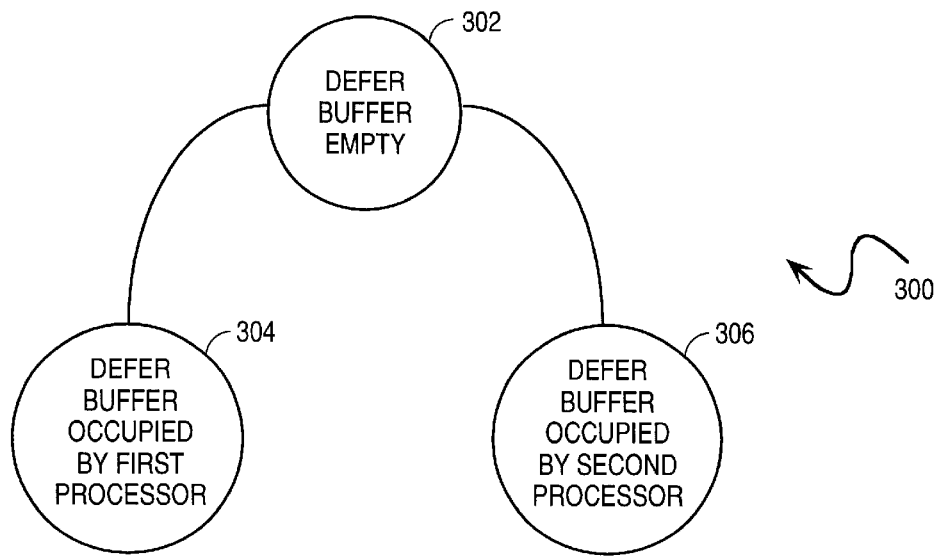
FIG. 3 illustrates a state diagram in connection with a first state machines, according to one embodiment of the present invention.

FIG. 3 illustrates a state diagram 300 in connection with a first state machines hereinafter referred to as "deferred state machine". The defer state machine operates on defer states that indicate which processor has occupied the defer buffer. The defer state machine includes 3 defer states 302, 304 and 306. At state 302, the defer flag is set to "11". This state indicates that the defer buffer is empty. From state 302 the defer state diagram may flow to state 304 where the defer buffer is occupied by the first processor 102 (CPU1) and the defer flag is set to "00". Also, from state 302, the state machine may flow to state 306 where the defer buffer is occupied by the second processor 104 and the defer flag is set to "01". A processor that occupies the defer buffer is deemed to be making progress.

Figure 4:
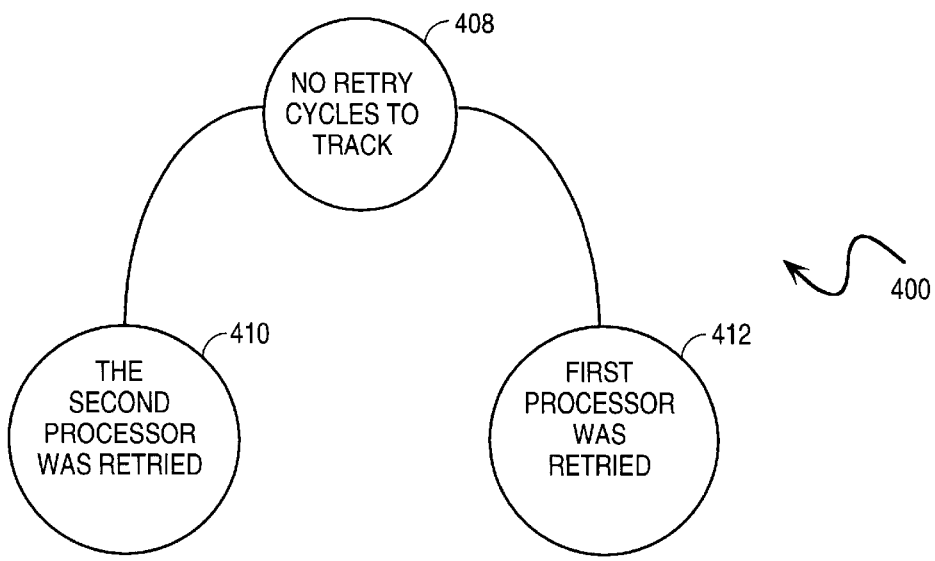
FIG. 4 illustrates a state diagram in connection with a second state machine, according to one embodiment of the present invention.

FIG. 4 illustrates a second state diagram 400 in connection with a second state machine (hereinafter referred to as "retry state machine"). The retry state diagram 400 has a state 408 at which the retry flag is set to "11" where there are no retried cycles to track. The retry state diagram also includes state 410 that indicates that the second processor 104 was retried (retry flag is set to "01") while defer flag was not set to 01. The H Unit 114 retries all cycles of first processor 102 until second processor 104 makes progresses. The retry state diagram further includes state 412 that indicates that the first processor 102 was retried (retry flag is set to "00") while defer flag was not set to 00. The H Unit 114 retries all cycles of the second processor 104 until first processor 102 makes progress.

When the defer state machine of FIG. 3 is at state "00" the defer buffer being occupied by the first processor, if the second processor is retried, the retry state machine transitions to its "01" state. If the first processor is retried, the retry state machine does not transition to its "00" state because it is still making progress. When the defer state machine of FIG. 3 is at state "01", the defer buffer being occupied by the second processor, if the first processor is retried, the retry state machine transition to state "01".

Figure 5:
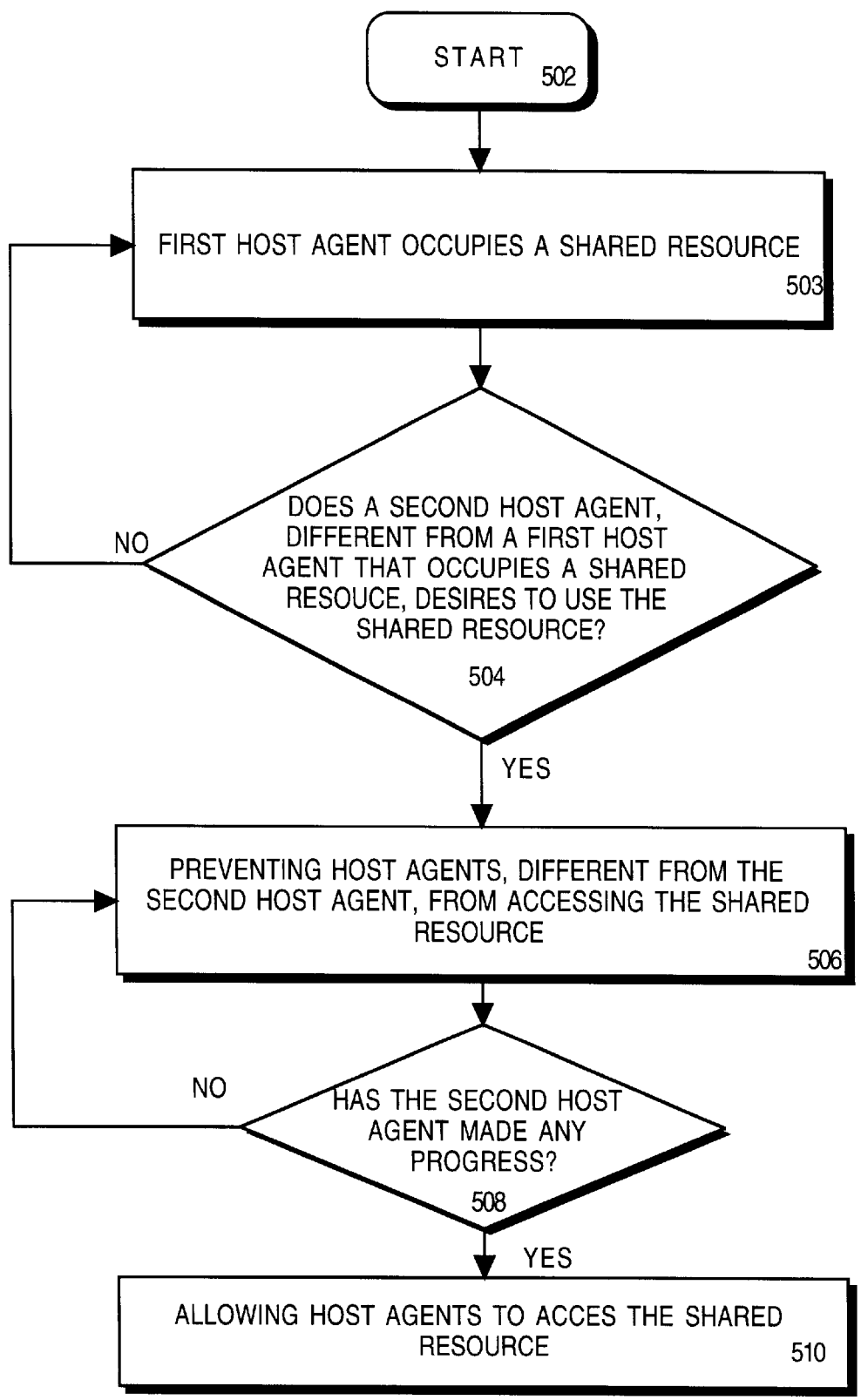
FIG. 5 illustrates a flow chart diagram in connection with a method for resource sharing in a multi-processor system according to one embodiment of the present invention.

FIG. 5 illustrates a flow chart diagram in connection with a process for resource sharing in a multi-processor system according to one embodiment of the present invention. The process starts at block 502 from where it passes to block 503 where a first host agent occupies a shared resource. The process then passes to block 504 where it is determined whether a second host agent, different from a first host agent that occupied the shared resource, desires to use the shared resource. If the second host agent desires to use the shared resource, host agents different from the second host agent are prevented from accessing the shared resource at block 506. The process then passes to decision block 508 where it is determined whether the second host agent has made any progress. If the second host agent has not made progress, the process flows back to block 506. If the second host agent has made progress, the process flows to block 510 where host agents are allowed access to the shared resource.

It should be appreciated that the present invention equally applies to computer systems that have more than two host agents. In cases where there are more than two host agents the defer and retry state machines may be modified accordingly by persons skilled in the art.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. An apparatus comprising:
   at least a first and a second host; and
   a chipset including a shared resource, the shared resource to prevent the first host occupying the shared resource from reaccessing the shared resource until the second host has had an opportunity to make progress in accessing the shared resource,
   wherein the chipset further comprises a queue to identify a host that initiated a leading access request to the shared resource.

2. The apparatus as in claim 1, wherein the chipset further comprises a control device to perform at least one of setting and resetting at least one of a plurality of flags.

3. The apparatus as in claim 2, wherein the at least one of a plurality of flags comprises a defer flag that is one of set and reset to specify a host currently occupying the shared resource.

4. The apparatus as in claim 3, wherein the defer flag prevents the host currently occupying the shared resource from reoccupying the shared resource until a different host has had an opportunity to make progress in accessing the shared resource.

5. An apparatus comprising:
   at least a first and a second host; and
   a chipset including a shared resource, the shared resource to prevent the first host occupying the shared resource from reaccessing the shared resource until the second host has had an opportunity to make progress in accessing the shared resource,
   wherein the shared resource includes a defer buffer.

6. An apparatus comprising:
   at least a first and a second host; and
   a chipset including a shared resource, the shared resource to prevent the first host occupying the shared resource from reaccessing the shared resource until the second host has had an opportunity to make progress in accessing the shared resource,
   wherein the chipset further comprises a control device to perform at least one of setting and resetting at least one of a plurality of flags, the at least one of a plurality of flags comprising a retry flag that is one of set and reset to allow retry access to the shared resource by the second host when the second host has initiated an access request to the shared resource and the shared resource is occupied by the first host.

7. A method comprising:
   preventing a first host occupying a shared resource from reaccessing the shared resource until a second host has had an opportunity to make progress in accessing the shared resource; and
   identifying a host that initiated a leading access request to the shared resource.

8. The method as in claim 7, wherein the preventing comprises performing at least one of setting and resetting at least one of a plurality of flags.

9. The method as in claim 8, wherein the at least one of setting and resetting at least one of the plurality of flags comprises specifying a host currently occupying the shared resource.

10. The method as in claim 9, further comprising preventing the host currently occupying the shared resource from reoccupying the shared resource until a different host has had an opportunity to make progress in accessing the shared resource.

11. A method comprising:
    preventing a first host occupying a shared resource from reaccessing the shared resource until a second host has had an opportunity to make progress in accessing the shared resource; and
    utilizing a defer buffer by the shared resource.

12. A method comprising:
    preventing a first host occupying a shared resource from reaccessing the shared resource until a second host has had an opportunity to make progress in accessing the shared resource,
    wherein the preventing comprises performing at least one of setting and resetting at least one of a plurality of flags, the performing at least one of setting and resetting at least one of the plurality of flags comprising allowing retry access to the shared resource by the second host when the second host has initiated an access request to the shared resource and the shared resource is occupied by the first host.

* * * * *